(12) United States Patent
Smith et al.

(10) Patent No.: US 7,788,121 B1
(45) Date of Patent: Aug. 31, 2010

(54) METHOD AND SYSTEM FOR EFFICIENTLY DISPATCHING SERVICE VEHICLES

(76) Inventors: Dennis E Smith, 3706 Laurel Bay Loop, Round Rock, TX (US) 78681; Martin Selbrede, 15900 Cornerwood Ct., Austin, TX (US) 78717

( * ) Notice: Subject to any disclaimer, the term of this patent is extended or adjusted under 35 U.S.C. 154(b) by 1494 days.

(21) Appl. No.: 11/116,843

(22) Filed: Apr. 28, 2005

Related U.S. Application Data

(60) Provisional application No. 60/566,043, filed on Apr. 28, 2004.

(51) Int. Cl.
*G06F 17/00* (2006.01)
(52) U.S. Cl. .......................................................... 705/8
(58) Field of Classification Search .................. 705/8, 705/9
See application file for complete search history.

(56) References Cited

U.S. PATENT DOCUMENTS 7,127,412 B2 * 10/2006 Powell et al. ................... 705/9

OTHER PUBLICATIONS

Revere, Lee; Re- engineering proves effective for reducing courier costs; Business Process Management Journal, v10n4; pp. 400-414.*

* cited by examiner

*Primary Examiner*—Thomas Dixon
(74) *Attorney, Agent, or Firm*—Rick B. Yeager

(57) ABSTRACT

A method for allocating articulated tasks to determinate resources such that enterprise efficiency is maximized. The method uses geographic parameters to perform a set of incrementally rotated reassessments using subtended angular offsets to optimally allocate tasks to resources, thereby rapidly approximating the results that would be obtained from a full permutation suite, but without the massive computational overhead associated with comprehensive permutation weighting. The method provides for proper handling of post-posited task insertions at optimal points within the parameter space, providing final determination authority to the system user. The parameter space can include temporal banding for resource-to-task association. The utility of the method for handling the core calculations of routing and dispatching software, such as is used in the many service industries, is transparent.

13 Claims, 2 Drawing Sheets

METHOD AND SYSTEM FOR EFFICIENTLY DISPATCHING SERVICE VEHICLES

RELATED APPLICATIONS

This application is related to U.S. Provisional Application No. 60/566,043 for "Resource Allocation Algorithm" filed Apr. 28, 2004, and claims the benefit of that application.

BACKGROUND

Field of Invention

The instant invention provides an optimized routing method that provides a good first-order approximation as to the most efficient assignment and scheduling of various tasks to specific, and generally mobile, resources. The most accurate method to ascertain the most efficient way to assign tasks to resources is to work through every possible combination of resource and task. However, when the number of tasks and resources become significant, evaluation of each possible permutation presents enormous computational loads on even the fastest machines available today. Therefore, such complex assignment, scheduling, and routing needs to be rendered tractable. A good approximation that can be computed quickly is desirable and of much utility. The application of such methods naturally extends to the dispatching of service technicians into geographic areas surrounding a main office, but can readily be extended and generalized to embrace any allocation of tasks to a fixed set of resources.

BACKGROUND

Software (e.g., Microsoft's MapPoint or Rand McNally's MapControl or MapEngine) for routing vehicles, men, and/or equipment (hereafter "resources") to different sites where they are needed (hereafter "tasks") over determinate time periods has generally focused on simple route optimization techniques rather than providing a global solution to the allocation problem. Such route optimization systems require that a set of geographic points be fed to the optimizer, with the first and last points being predetermined. With a minimum set of four points, such route optimizers have the opportunity to process all possible route permutations to determine which permutation provides the shortest route. The determination of the distal route points, and the assignment of the intermediate tasks to a determinate resource, must be handled (usually manually) prior to feeding these inputs to the route optimizer.

Factors associated with the determination of which tasks are to be assigned to which resource include, but are not limited to, the following: the urgency or priority of the task, the preferred time band in which the task must be assigned, the complexity of the task being matched with the complexity rating of the resource (e.g., a mechanic trained to handle a particularly difficult task), any preloaded distal points (a preference that a task be the first on the stack, known colloquially as a "first call" parameter), the availability of the resource, the available time spans throughout the day during which the resource is available, the length of time accorded to the task, and the routing length. While traditionally handled manually, there is a need for methods to automate the process by which tasks are assigned to properly qualified and allocated resources. The implementation of such an method improves the overall enterprise efficiency over that of simple route optimization techniques, such that the vehicles travel shorter distances aggregated over the course of time, resulting in (1) savings in wear and tear on vehicles, (2) savings on gasoline, and (3) the possibility for increasing available time for additional tasks to be allocated to the more-efficiently scheduled resource. The net improvement in overall enterprise productivity thereby introduced is of considerable value over a broad range of application spaces across many different industries

SUMMARY OF INVENTION

The instant invention achieves an excellent approximation to full permutation assessment (which becomes computationally prohibitive for even moderate quantities of resources and tasks requiring mutual allocation) by running parametrically filtered assessments on a series of incrementally rotated optimization overlays. In the simplest embodiments, these overlays can be understood as a series of pie slices radiating from a centralized point, normally associated with a common departure and return point (e.g., a central office that dispatches trucks into the field in the morning, to which the trucks return in the evening). These slices are "virtual" slices that are associated with the furthest points out on the perimeter of the surface upon which the tasks are geographically distributed. The initial trial slicing is assessed based on the locations and radial distributions of the tasks farthest in distance from the center. These provide the initial rays which are distributed about the enterprise center (in the simplest embodiment; more complex embodiments do not require a single central dispersion point for the resources). In the most primitive embodiments, the intermediate points are calculated based on their tangent distance from the line joining the central point and the distal points. The closest intermediates are placed in sequential order for each set of distal points. The insertion of the closest point between the distal ends of the outgoing or incoming routes creates brand new trajectories from which subsequent tangent distance can be calculated for additional insertions. The accrual of these line segments creates a segmented loop from the initial point, through each intermediate point in sequence, to the distal point, and then back again through a different set of intermediate points to the origin. Where this is duplicated for several different distal points distributed around the origin, a pseudo-petal pattern of segmented loops is proscribed. Such petal geometries are traditionally associated with legitimate solutions to the well-known "traveling salesmen problem," which involves the determination of route optimizations under certain parameterized constraints.

One important elaboration of the foregoing method is the substitution for actual drive distances for the geometric tangent distance ("line of sight" distance, or colloquially termed "as the crow flies"). Linkage to an appropriate routing engine that provides actual distances traveled by vehicles on physical streets can only enhance the general accuracy of the method, particularly in regions where geographic barriers to efficient travel obtain (e.g., mountains, rivers, lakes, etc.).

Further optimization of the base method is obtained by rotating the virtual slices through a determinate angle and recalculating the distances. The rotation provides the method the opportunity to be applied to additional permutations of the data. Moreover, the "tangent band" (comprised of the rectangular region extending away from a line connecting two tasks on the geographic surface in question) can be width-modulated as well to provide additional permutations. By limiting the number of permutations to those likely to generate materially different results, such as those just disclosed, it is possible to approach the accuracy of a full-suite permutation analysis without its computational overhead.

Parametric constraints fall into several categories. The first category is that of temporal constraints. For example, it may be desirable to divide a day into morning and afternoon "time bands." Certain tasks are to be allocated prior to noon, while others are to be allocated after noon, while yet others have no stated preference. The method must be capable of honoring these restrictions by parametric filtration.

One consequence of temporal parametric filtration is that it becomes desirable to associate distal points with the transition between the morning and afternoon time bands. This makes for tighter "petal loops" in the routing geometry. Therefore, the determination of distal points is to be adjusted with reference to the time bands being applied to the problem. The morning jobs and afternoon jobs that are the farthest from the routing origin should be associated if no "all day" (undetermined time band) jobs are any farther from the origin than they are.

Time bands may, for certain enterprise applications, be more elaborate than a simple morning-afternoon division, and can, in fact, become arbitrarily complex. Some enterprises may divide a day up into time bands that are two hours wide (8:00 am-10:00 am, 10:00 am-12:00 pm, 12:00 pm-2 pm, 2 pm-4 pm, 4 pm-6 pm, etc.). Under these circumstances, the additional parametric filtration required to guarantee that tasks are associated with the appropriate resources within the required time bands will undoubtedly result in a loss of routing optimization. There is, in short, an inverse relationship between routing efficiency and time band density. The motivation for an enterprise to impose more minute control of time bands it to nominally improve service to the tasks in the field, which most commonly translates to providing better customer service. The trade-off for an enterprise guaranteeing a two-hour window for a service resource to arrive on-site is a corresponding loss of routing efficiency, since the method no longer has the freedom to optimize within more liberal limits. Human factors in customer relations often trumps routing efficiency as more important for certain enterprise applications.

Parametric filtration also applies to the complexity rating of a resource. An obvious example of this would be the case of a mechanic who is rated at a certain complexity level, who is assigned to tasks that may or not correspond in complexity level to the mechanic's actual capabilities. There are two deleterious results to avoid: scheduling a mechanic with an inadequate complexity rating to a site, and scheduling a vastly over-qualified mechanic to a site requiring a very low complexity rating. In the former case, the proposed resource allocation does not satisfy the task (the resource is inadequate), while in the latter case there is a high likelihood of lost opportunity costs for sending an overqualified resource to a task, when he could earn the enterprise more money on a project better fitted to his capabilities. The filtration must satisfy both criteria with respect to complexity.

Parametric filtration applies to the case of the "preferred resource," in which instance one or more resources might have to be tied to a given task by mandate. One real world example might be that a given task may be associated with a service call to a household that is Spanish-speaking; therefore, only service technicians who are bilingual should be sent to that service call. If the enterprise has two such mechanics on staff, then they can be targeted as preferred resources for that task. The method must choose from among the preferred resources in performing its allocation function. This requirement may in turn determine which resources are assigned to which radial slices of the geographic "virtual pie" around the origin.

Prioritization of tasks may entail the enforced front-loading of tasks toward the earlier portion of their respective time bands (where applicable). Prioritization always de-optimizes the final results. As with denser time bands, the trade-off is between better customer service and superior routing efficiency. The enterprise must itself determine the value of this trade-off as played out in its own market(s).

The length of time allotted to a task must be factored into the allocation process, since a resource has a finite amount of hours during the day to be allocated. A single 8-hour-long task could fill a single resource for an entire day, while there may be room for 16 half-hour tasks during that same day. The method must track the available time for each time band (if such there be) and disallow any insertions that "bust the time budget" for the resource, or, more generally, will alert the system operator of the overflow and allow the operator to approve or disallow the insertion based on enterprise exigencies (overtime policy, crunch period, etc.).

Resources are not always available for the entire day. The method must accommodate, on either an ad hoc or continuous basis, differential start-start times for resources as well as task time band allocation constraints. The real world analog of this required behavior is the case of a mechanic that is coming in after lunch because of a medical appointment in the morning. The method must be flexible enough to handle such complexities.

BRIEF DESCRIPTION OF THE DRAWINGS

A better understanding of the present invention can be obtained when the following detailed description is considered in conjunction with the following drawings, in which.

DETAILED DESCRIPTION OF EMBODIMENT

Figure 1:
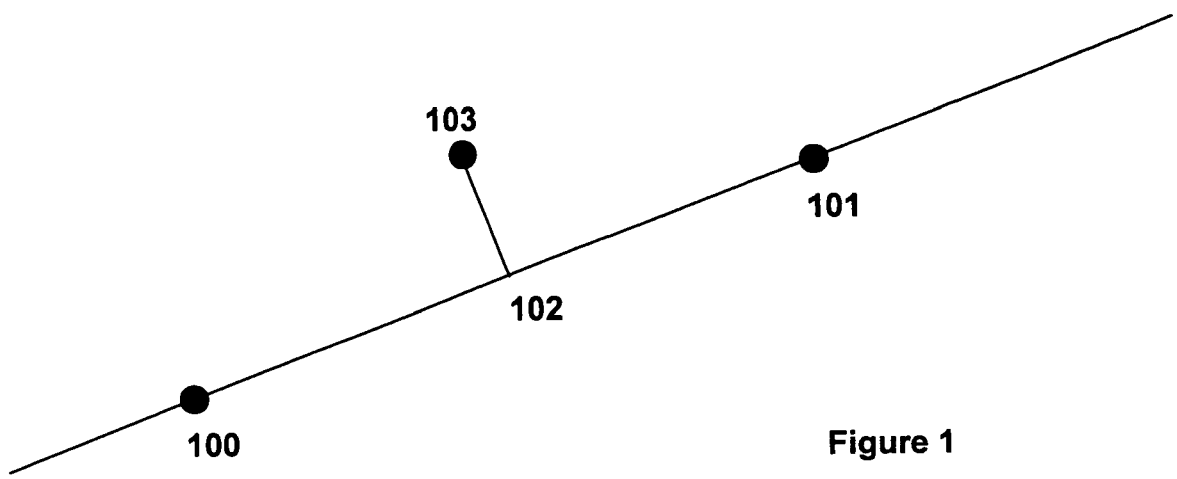
FIG. 1 illustrates a representative example of tangent distance determination utilized by the MINDISTANCE function of the present invention.

In the following description, numerous specific details are set forth to provide a thorough understanding of the present invention. However, it will be apparent to those skilled in the art that the present invention may be practiced without such specific details. In other instances, well-known programming techniques have been invoked in general terms in order not to obscure the present invention in unnecessary detail. For the most part, details considering computer language-specific considerations and the like have been omitted inasmuch as such details are not necessary to obtain a complete understanding of the present invention and are within the skills of persons of ordinary skill in the relevant art.

Example

Assignment of Service Calls

The present invention performs optimized task allocation to a known set of resources. A straightforward real-world example of such allocation is the assignment of various service calls, distributed geographically, to a set of company service technicians. It is understood that certain parameters and criteria might need to be applied to the assignment process, and thus can be added to the method on an as-needed basis. An example of such parameterized filtration would be matching a service technician of the appropriate technical proficiency and experience to tasks that require such expertise. A representative listing of such filters would include time bands (service is preferred during certain time bands into which the business day could be divided), complexity rating of the mechanic, priority of the task (pushing it forward in the assignment stack to an earlier position than would otherwise be suggested by geographic routing), preferred mechanic (e.g., the need to send a Spanish-speaking mechanic to a certain site, or, conversely, the need to prevent a mechanic from going to a site where past altercations with the client have occurred), etc.

The availability of the resources to be allocated (the service technicians, in our example throughout this disclosure) is also subject to change. A given resource might be unavailable on a given day, or fraction thereof.

The routing methods, which sequence the jobs in the most efficient order with respect to distance traveled by the resources (technicians), are most effective when they are factored into the assignment process. By starting with the routing method as the fundamental engine, applying parametric filtration to the tasks during the allocation process (whereby various constraints are imposed upon candidate tasks so that they are allocated in compliance with those constraints), and geometrically rotating the axes of the router to increasing the sampling range of the method (as it develops solutions of potentially greater efficiency) is the most practical way to achieve the desired result. This method lends itself to rapid calculation, based on known factors, and avoids the massive amounts of calculations required to perform a full permutation analysis (in which every single combination of assignments is sampled and compared, which could run into hours or even days of computing time for large sets of resources and tasks). Although a full permutation analysis will ultimately lead to the most efficient allocation, the excellent approximation achieved by the present invention, which provides timely direction as to task assignment, is to be preferred whenever more than a dozen tasks are defined. This is particularly true when the calculation of routing distances is handled via off-line processing, such as with web-based routing engines. Even using Pythagorean "line of sight" distance calculations, the number of calculations to be performed becomes impractically large in short order. If computing power, following Moore's Law, should grow to the point that a full permutation is accessible in a reasonable time frame, the parametric filtration portions of this invention would remain applicable and relevant, and thus are claimed herein as both an adjunct to the main routing methods and independently, in their own right.

The simplest method to be described hereunder divides a business day into two periods: morning and afternoon. This is a dual time-band system, characteristic of the majority of companies that are likely to deploy the solution disclosed herein. The method is premised on the most efficient route shape that can be constructed in a dual time-band system. If it is presupposed that a service technician's truck originates at one point (e.g., the main office) and is to return there at the end of the day, the shortest route the technician can take would send him to his farthest point from the office at mid-day, at the point at which the morning time-band transitions to the afternoon time-band. In vernacular, the technician should work his way out to the farthest points from the office during the morning, and work his way back to the office in the afternoon. Deviations from this general pattern reflect efficiency detractors, which are invariably due to the application of parametric filtration. It is generally true that all filters detract from efficiency, since the determining factor for a given allocation is no longer raw routing efficiency (the shortest distance traveled) but other factors (priority, mechanic preference, etc.) that take precedence over, and affect the final results of, the routing method. This being understood, the following general rule would apply in most cases, and is thus incorporated into the main method: the system should "pair up" and associate the most distant points within the morning time-band with the most distant points in the afternoon time-band.

The association is more narrowly defined thus: the origin for the resource is defined as point A, which is also the point of return at the end of the day. The most distant point from A during the morning time-band is point B. The most distant point in the afternoon time-band that is closest to point A is point C. The fundamental route skeleton is built from this triad: the morning route begins at point A and ends at point B, the transition between the time-bands occurs as the technician travels from point B to point C, and the afternoon time-band involves the technician's progress from point C back to the origin, point A.

The method, then, must set up these triads for each resource (technician), arranging them radially around the departure origin, point A, which the resources have in common. In more complex forms of the method, different origins for different resources may apply (corresponding to occasions when a service technician may leave from his home rather than from an office, or occasions when a given user of the method has multiple offices from which technicians are being dispatched).

Determining Distances

Once the triads are established, it can be appreciated that unscheduled tasks will be distributed in spatial relation to the line segments joining the various triads associated with the resources (technicians) available to the method for processing. The temptation to directly use line of sight distance to assess proximity of other tasks for insertion within a triad must be resisted, since such an approach prematurely rules out tasks insertions that are, in fact, geographically efficient. As an example, consider that point A and point B might be sixteen miles apart. Another point, D, lies on the path midway between A and B. A raw distance analysis tells us that D is eight miles from either A and B. This is deceptive: what is actually relevant is "how far out of the way must the technician drive to include D in his route?" Point D may be only a half-mile out of the way, when considered from the perspective of the already predetermined route the technician is taking from point A to point B. Therefore, the method should use the 0.5 mile figure that represents the actual driving impact on the technician, and not the 8.0 mile figure based on line-of-sight considerations. An overlooked but highly optimal way to acquire the correct value is for the method to include a "tangent distance" calculation as well as a line-of-sight calculation. The tangent distance, when applied equivalently to all cases being handled by the method, gives a proportional rating or weighting to all distances. The method then chooses the lower of the two values, tangent distance or line-of-sight distance, and uses that in evaluating candidates for insertion into a given technician's route.

The tangent distance is defined as follows, using the same example in the preceding paragraph. Draw a line from point A to point B, creating a line segment AB. The tangent distance calculated for D is the shortest distance between point D and the line segment AB, which is found by drawing a line perpendicular to AB that intersects point D. If the point where this new line crosses AB is called E, then the tangent distance is the length of segment DE. The method will select and process information using the lesser of the three line segments, AD (line of sight from A to D), DB (line of sight from D to B), and DE (tangent distance, or "how far out of the way is D when traveling from A to B?").

Determination of the tangent distance can be achieved by exploiting some basic geometry. If two lines in a 2-dimensional plane are parallel, they have identical slopes. If the two lines are perpendicular, the slope of one is the negative multiplicative inverse of the other. For example, if the slope of one line is 3, the slope of any line perpendicular to that line would be negative 1/3. This principle does have the possibility of being impossible to calculate for a particular case, namely, when one of the two segments is a vertical line. A vertical line has infinite slope, which follows from the fact that a horizontal line has zero slope, meaning the perpendicular to it (a vertical line) would have a slope of negative 1/0. Division by zero is computationally unsound, generating an error condition. This can be avoided if the tangent calculation incorporates a native rotation, applying the rotation of coordinate axes to any case it detects could lead to an error condition due to, e.g., division by zero.

The use of tangent distance is illustrated in FIG. 1. The line that connects the origin 100 and the destination 101 is the original travel path prior to consideration of a third task 103. Element 100 corresponds to point A in the previous discussion, while 101 corresponds to point B and 103 corresponds to point D. The desired tangent distance is the length of the segment drawn from 103 to 102, where 102 is the point of intersection between the tangent distance line and the line drawn between 100 and 101, where the angle of intersection is 90 degrees. The point of intersection, 102, must lie between 100 and 101 or it is invalid and there is to remain unincorporated in determining the minimum distance. A further constraint is placed upon the tangent distance (line segment between 103 and 102), namely, that it cannot exceed one-fourth the distance between 100 and 101. The value of one-fourth can be arbitrarily changed to tune the system for different kinds of performance, by providing some overlap between the respective eligible zones of dispatch for each technician. The inverse of this one-fourth value, four, is called the WidthFactor in subsequent portions of this disclosure, and has the same meaning as here (since it elsewhere appears in the denominator of the fractional expression it is part of).

The logic to be used in calculating the line of sight distances and the tangent distance is as follows. In this example, point A is located at coordinates $X_A$ and $Y_A$, point B is located at points $X_B$ and $Y_B$, and point D is located at points $X_D$ and $Y_D$, as indicated. The square root function is abbreviated as SQRT, absolute value is abbreviated as ABS, the minimum value of a set of values is abbreviated as MIN, and exponentiation is denoted by the symbol "^". The logic repositions the coordinates so that $X_A$ and $Y_A$ are situated at the origin (0,0), and then the axes are rotated to insure computational tractability and avoid inadvertent division by zero. The final conditional branching involves a tuning step based on an arbitrary value termed the WidthFactor. A nominal and practical value for the WidthFactor is 4; the final branching would then specify that the tangent distance will be returned to the calling method if and only if the tangent distance is less than or equal to one-fourth of the total distance from point A to point B. If the tangent distance exceeds this value, then the smaller of the two line-of-sight distances (either AD or BD) will be returned in lieu of the tangent distance, since that value would more provide more efficient routing given the fact that the tangent distance loses utility as it grows too large relative to the distance between the points being used to set the fixed route being used for calculation. Note also that the tangent distance is rejected and the smaller of the line-of-sight values ("initialdistance" or "finaldistance") returned if point D does not actually lie between points A and B. This is an important consideration, since it is possible to have a very small tangent distance but a large actual distance if one fails to restrict the range of operation of this function to the area between points A and B. A simple example would be a line drawn between two locations two miles apart. If you extended this line a hundred miles farther, and placed a third point on the extended line at that distance, its tangent distance would be zero (since it sits on the line) but its actual distance is a hundred miles. The tangent distance, therefore, is meaningless except when calculated between points A and B. The final branch of the subsequent function filters out such tangent distances, since it cannot always be assumed that the inputs have had such safety factors applied to them, and good programming practice dictates anticipation of potentially deleterious inputs. Below is a listing of the MINDISTANCE function, which accepts up to 6 parameters: the x and y coordinates of points A, B, and D. The MINDISTANCE function is used for all line-of-sight distance calculations in subsequent portions of the method.

*MINDISTANCE function:

WidthFactor=4 (an arbitrary scaling factor defining the resulting triangle)

nBaseLine=SQRT((($Y_B-Y_A$)^2)+(($X_B-X_A$)^2))

normalx=iif($X_A<X_B$, $X_A$, $X_B$)

normaly=iif($X_A<X_B$, $Y_A$, $Y_B$)

$X_A=X_A$-normalx $X_B=X_B$-normalx $X_D=X_D$-normalx $Y_A=Y_A$-normaly $Y_B=Y_B$-normaly $Y_D=Y_D$-normaly hypotenuse=SQRT((($Y_B-Y_A$)^2)+(($X_B-X_A$)^2))

cosine_phi=($X_B-X_A$)/hypotenuse sine_phi=($Y_B-Y_A$)/hypotenuse tangentdistance=Abs(((-$X_D$)*sine_phi)+($Y_D$*cosine_phi))

initialdistance=SQRT((($Y_D-Y_A$)^2)+(($X_D-X_A$)^2))

IF ($X_A<X_D<X_B$ .OR. $X_A>X_D>X_B$) .and. tangentdistance<nBaseLine/WidthFactor RETURN (MIN(tangentdistance,initialdistance,finaldistance))

ELSE

RETURN MIN(initialdistance,finaldistance)

ENDIF

Note how the value "tangentdistance" is calculated, by applying the rule concerning the negative of the multiplicative inverse of the slope upon rotation of the axes.

Where more elaborate distance routines are available (e.g., turn-by-turn street directions as opposed to line-of-sight distance calculations), a subtle variant of the MINDISTANCE function is called for. Conceptually, the variant is relatively simple. Determine the actual distance traveled between points A and B using a geographic street routing engine. Then determine the total distance traveled when point D is inserted as a midpoint destination between points A and B (the total distance traveled from A to D to B). Since A and B are already fixed, the meaningful distance represented by the insertion of D is the length of the original route A-to-B subtracted from the augmented route A-to-D-to-B. This represents "how far out of the way" the technician must travel to insert point D into his route, and correlates with the line-of-sight calculation provided by the MINDISTANCE function articulated above. In all cases, the line-of-sight calculation is the shortest distance possible, while turn-by-turn street directions almost invariably provide a larger distance to travel. It is generally the case that the differences between the two systems are proportional, and the average error is well understood (barring the existence of geographic barriers, like mountains or lakes, that can cause the actual route traveled to far exceed the average error. In the absence of geographic barriers, the maximum error is can be estimated as the ratio of the combined length of two sides of a square to the diagonal hypotenuse through the square. The two sides represent the maximum distance to be traveled, while the diagonal represents line-of-sight travel. In rectilinear street layouts, then, the actual distance would measure 2 relative units while the line of sight represents 1.414 relative units. Therefore, line-of-sight approximations would be 30% lower than actual values for the worst case. On average, the error would be closer to half this value, and has been measured for several metropolitan areas (e.g., Houston and Austin) to be around 17%. Once geographical obstacles and barriers are introduced, which can force much longer actual travel to go around the obstacle, the error can become very significant, with line-of-sight providing deceptive cues as to comparative distances and routings. In such instances, the MINDISTANCE function applied to line-of-sight measurements is less reliable than the differential calculation proposed at the beginning of this paragraph. For all subsequent discussion the MINDISTANCE function will be understood to mean either the function already articulated for line-of-sight use, or the differential calculation defined above for non-line-of-sight turn-by-turn route length determination methods.

On the assumption that all resources (technicians) begin at a central location (point A throughout this and subsequent examples), it is necessary to assign each resource's farthest morning task. This assignment becomes most efficient when the angular distance between these tasks is the largest, that is, when the resources are sent over all points of the compass, in different directions. Therefore, the method must properly determine what the most widespread set of distant morning points are, based on trigonometric considerations, and then associate the closest afternoon tasks to this selection of morning tasks at the farthest periphery of the geographic area being covered. This process itself must survive parametric filtration, meaning that from the outset, the method is driven by the filters to prevent premature assignment of tasks to the wrong resource (a service job to a technician unqualified to perform it). Therefore, it is to be understood that all relevant filters govern the slicing of the region surrounding A into smaller slices assigned to resources (technicians), and that such selection is not a blind process premised solely on trigonometric considerations.

Assignment Method

In this example, the method is divided into three subfunctions, called AMTERMINI, AUTOMILEAGE, and TESTDISPATCH. The function of AMTERMINI, as its name suggests, is to find the end point destinations for the technicians for the morning period. Once determined, AMTERMINI will be able to use them as inputs for determining the correlated "first job in the afternoon" that is nearest to each AM end point. This function is the precursor to all subsequent calculations, and sets up proper boundary conditions within which the subsequent functions will operate upon the remaining tasks to be allocated to the resources (technicians in this example).

At the conceptual level, the sequence of events is as follows:

Set AMTERMINIok to FALSE

Process AMTERMINI; if points are determined, set AMTERMINIok to TRUE

IF AMTERMINIok is TRUE
   Process AUTOMILEAGE
   Process TESTDISPATCH

ENDIF

It should be noted that the failure to set AMTERMINIok to TRUE corresponds to the relatively trivial circumstance that there are no tasks to allocate. Where there are tasks to allocate to resources, the subsequent subfunctions needed to be sequentially processed.

Figure 2:
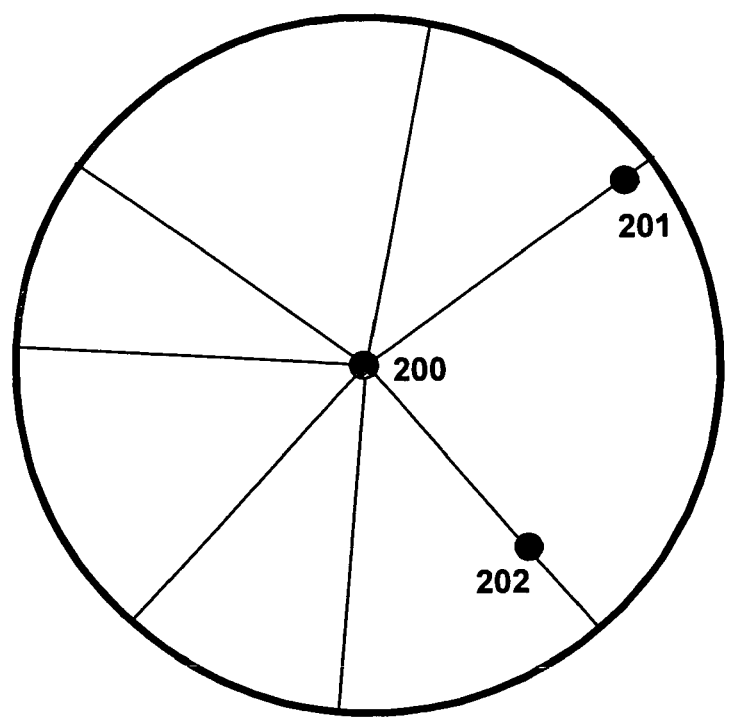
FIG. 2 illustrates the maximization of radial spread around the central dispatching point achieved by the AMTERMINI subfunction of the present invention.

FIG. 2 illustrates the principles invoked in the AMTERMINI subfunction. The origin for resource dispatching is considered as being located at the center of a circle at point 200. Various tasks are geographically distributed around 200, such as points 201 and 202. The radial axes such as the line from 200 to 201, and the line from 200 to 202, have a subtended angle between them, which AMTERMINI is designed to maximize for the tasks most distant from 200 during the morning. A third task very close to 201, for example, is not likely to be assigned to a different technician (barring the influence of other factors), because AMTERMINI concerns itself with assigning a unique task for each available technician. AMTERMINI therefore seeks the least proximate distal morning destination from a trigonometric point of view.

AMTERMINI does check for certain housekeeping functions with respect to database referential integrity. These are included in the subfunction listing provided below, but are not the key to actual operation. They do, however, prevent the processing of null sets, which generally induce an error condition in most programming languages. The language used below is Microsoft Visual Foxpro 8, but the meaning of each line is explained in the asterisked comment underneath it, thereby providing a mental bridge for implementing the same function in a large range of related programming languages and architectures. The listing has been made as generalized as possible, but it does observe the prerogatives of modern Object-Oriented Programming (OOP), as evidenced by the object naming conventions ("thisform.object . . . ", etc.) and the use of properties, events, and methods (the PEM programming model). It is to be appreciated that the same functionality can be achieved without invocation of OOP, simply by substituting memory variables, memory arrays, or even disk-bound table structures for the OOP objects contemplated hereunder. A line beginning with an asterisk (*) is an explicatory comment not part of the code. In-line comments are preceded by a double ampersand (&&) to show that they, too, are not part of the code being compiled. The tasks to be allocated are tabulated in a memory array called Thisform.gaListMaster, which is copied to a "scratch" array for subsequent manipulation called TMscratch. The number of resources (technicians) is denoted by nTechCount, which represents a prefiltered set based on resource availability (e.g., a count of the number of technicians in an "Include These Technicians" list). Information concerning existing resources (technicians) is stored in the memory array named Thisform.gaMechanics. The listing for the ANGLE function follows the main method.

Determining the Morning End Points

```
* LISTING OF SOURCE CODE FOR AMTERMINI subfunction
IF nTechCount=0 && No legitimate technicians (resources)
   Thisform.ITerminiOK=.F. && Avoid AUTOMILEAGE without termini
   RETURN && Exit the AMTERMINI subfunction (same throughout)
ENDIF
LOCAL x1, y1, x2, y2, x3, y3, distance, nAMRemainder, ITMscratchOK
ITMscratchOK=.F.
Thisform.ITerminiOK=.F. && Set false to bar entering Automileage Method without termini
* Determine farthest jobs from base station
LOCAL nNumberCopied
nNumberCopied = ACOPY(Thisform.gaListMaster,TMscratch)
IF nNumberCopied<1 && Can't autoschedule if there's nothing to schedule!
   * No Jobs To Be Auto-Scheduled.
   RETURN
ELSE
   ITMscratchOK=.T.
ENDIF
* Block to catch unwanted duplicates
***************************************************
LOCAL nDeleteThese, nFindMatch
nDeleteThese=0
IF ITMscratchOK=.T.
   FOR i=1 TO ALEN(TMscratch,1)
      nFindMatch=0
      IF thisform.IMasterOK=.T.
         nFindMatch=ASCAN(thisform.gaMaster,TMscratch[i,3],-1,-1,3,8)
      ENDIF
      IF nFindMatch>0
         TMScratch[i,15]=999999
         nDeleteThese=nDeleteThese+1
      ELSE
         x3=Thisform.gaListMaster[i,16]
         y3=Thisform.gaListMaster[i,17]
         * store distances from base station in 15th column if TMscratch
         TMscratch[i,15]=MINDISTANCE(CompanyAbs_x,CompanyAbs_y,x3,y3)
      ENDIF
   ENDFOR
ENDIF
IF nDeleteThese>0          && there are elements to be deleted from TMscratch
   =ASORT(TMscratch,15)   && Pushes candidates for deletion to bottom of the array stack
   nOriginalSize=ALEN(TMscratch,1)
   IF nDeleteThese<nOriginalSize && Don't wipe the whole thing out
      FOR i = 1 TO nDeleteThese
         ADEL(TMscratch,nOriginalSize-i+1) && Delete all appropriate elements
      ENDFOR
      * Resize the TMScratch memory array to the new dimension
      DIMENSION TMScratch(nOriginalSize-nDeleteThese,ALEN(TMscratch,2))
   ELSE
      ITMscratchOK=.F.
   ENDIF
ENDIF
***************************************************
=ASORT(TMscratch,15,-1,1) && all jobs in TMscratch sorted from farthest away to closest
* Separate them radially before next step. Create the matrix first
nDimension=ALEN(TMscratch,1) && Determine number of rows in TMscratch array
* create an array nDimension X nDimension in size; populate with Boolean .F. throughout
PUBLIC gaRadial(nDimension,nDimension) && Sets default values in array all to .F.
LOCAL nProscriber
FOR i = 1 TO ALEN(TMScratch,1)
   FOR j=i+1 TO ALEN(TMScratch,1) && handle off-diagonal values; avoid redundancy
      IF j>i
         * Filter out for bad X and Y coordinates (designated by "9999" as placeholder value)
         IF TMScratch[i,16]=9999 .OR. TMScratch[i,17]=9999
            nProscriber=9999
            nProscriber=.F.
         ELSE
            * ANGLE function calculates angle difference
            nProscriber=ANGLE(CompanyAbs_X,CompanyAbs_y,TMScratch[i,16],TMScratch[i,17],TMScratch[j,16],TMScratch[j,17],.T.)
         ENDIF
         gaRadial[i,j]=nProscriber
      ENDIF
   ENDFOR
ENDFOR
* REMOVE RADIALLY ADJACENT ITEMS (DELETE CLOSER MEMBER OF THE PAIR)
LOCAL iClose, jClose, nNewMinimum, nOldMinimum, nRowDeleteNumber,
LOCAL nNumberToDelete
```

-continued

```
* Store amount of rows to delete from TMscratch; initialize that value here to zero
nNumberToDelete=0
IF nTechCount>1 && Infinite loop for 1 mechanic. Avoid this pitfall.
   LOCAL nDim, IXSort
   nDim=0
   IXsortOK=.F.
     FOR i = 1 TO ALEN(gaRadial,0       && go through the array element-by-element
        IF VARTYPE(gaRadial[i])="N"     && avoid using array elements containing value .F.
          nDim=nDim+1 && Increment separately since index "i" is not suitable
          DIMENSION xSort(nDim,2)
          IXsortOK=.T.
          AINS(xSort,nDim)    && Insert a new row in the xSort memory array; populate it
next.
          xSort[nDim,1]=gaRadial[i]
          xSort[nDim,2]=i
        ENDIF
     ENDFOR
     IF IXsortOK=.T. && Assure there are meaningful elements in this memory array
        = ASORT(xSort,1)
     ENDIF
     IF ITMscratchOK=.T.
        DO WHILE ALEN(TMScratch,1)-nNumberToDelete > nTechCount
           IF ITMscratchOK=.F. && Once TMscratch is empty,
              EXIT   && leave the loop
           ENDIF
     IF IXsortOK=.T.
        * Set the array coordinates of the smallest angular item
        iClose=ASUBSCRIPT(gaRadial,xSort[1,2],1)
        jClose=ASUBSCRIPT(gaRadial,xSort[1,2],2)
     ELSE
        EXIT
     ENDIF
     * Insure that array dimensions have non-zero values
     IF iClose>0 .and. jClose>0
        nRowDeleteNumber=MAX(iClose,jClose)
        * Exclude it from the FOR loop calculations by making it non-numeric (Boolean)
        gaRadial[iClose,jClose]=.F.
        IF nRowDeleteNumber>0 && If zero, there are no legal array dimensions.
           * Push miles high to implement deletions safely
           TMScratch[nRowDeleteNumber,15]=999999
           nNumberToDelete=nNumberToDelete+1 && increment qty to be deleted
           xSort[1,1]=9999 && replace 2nd column of relevant rows with 9999
           * We're now prepared for sort for top (closest radial) element.
           IF ALEN(xSort,1)>1
              * Push all other members of the deleted row to bottom of array
              FOR i=2 TO ALEN(xSort,1)
                 IF ASUBSCRIPT(xSort,i,1)=nRowDeleteNumber
                    xSort[i,1]=9999 && no angle should exceed 180
                    * This pushes ineligible candidates to bottom of array
                 ENDIF
              ENDFOR
              ENDIF
              =ASORT(xSort,1) && resort, put bad candidates at bottom, out of the way
           ENDIF
        ELSE
           EXIT
        ENDIF
     ENDDO
   ENDIF
ENDIF
IF nNumberToDelete>0 && there are elements to be deleted from TMscratch
   =ASORT(TMscratch,15) && Pushes candidates for deletion to bottom of the array stack
   nOriginalSize=ALEN(TMscratch,1)
   IF nNumberToDelete<nOriginalSize && Don't wipe the whole thing out
      FOR i = 1 TO nNumberToDelete
         ADEL(TMscratch,nOriginalSize-i+1)
      ENDFOR
      DIMENSION TMScratch(nOriginalSize-nNumbertoDelete,ALEN(TMscratch,2))
   ELSE
      ITMscratchOK=.F.
   ENDIF
ENDIF
Thisform.NumTermini=0
LOCAL ITMscratchOK
IF ALEN(TMScratch,1)>0
   ITMscratchOK=.T.
ELSE
   ITMscratchOK=.F.
```

-continued

```
ENDIF
FOR k = 1 TO ALEN(Thisform.gaMechanics,1) && Initialize all 17th column values to zero
   Thisform.gaMechanics[k,17]=0
ENDFOR
FOR k = 1 TO ALEN(Thisform.gaMechanics,1)
   LOCAL nEmployeeStart
   * Thirteenth column stores the daily start time for the technician, in minutes from midnight.
   nEmployeeStart=Thisform.gaMechanics[k,13]
   IF ITMscratchOK=.F. && exit the loop if we can't process any jobs through it.
      EXIT
   ENDIF
   * Twelfth column stores Boolean value for technician availability (inclusion/exclusion)
   IF thisform.gaMechanics[k,12]=.F. && Use only included technicians, not excluded ones
      LOOP
   ENDIF
   * Available time in the morning and afternoon is stored for each resource (technician).
   * These are stored as integer minutes in properties PMRemainder & AMRemainder.
   ck=ALLTRIM(STR(k))
   listk="thisform.MechContainer"+ck
   TestPMRemainder=listk+".PMRemainder"
   TestAMRemainder=listk+".AMRemainder"
   * CHECK OVERTIME
   IF Overtime.Value=.T. && ADD OVERTIME VALUES to all mechanics
      &TestPMRemainder = &TestPMRemainder+(60* Overtime.Value)
   ENDIF
   cArrayk="gaMech"+ck
   PUBLIC &cArrayk(1,13) && Make sure its visible publicly
   nMechComplexity=Thisform.gaMechanics[k,7]
   &cArrayk[1,1]=0 && Service.Code
   &cArrayk[1,2]=0 && Duration in Minutes
   &cArrayk[1,3]=CompanyAbs__X && Set Start Point at Office (Ground Zero)
   &cArrayk[1,4]=CompanyAbs__y && Set Start Point at Office (Ground Zero)
   &cArrayk[1,5]=nEmployeeStart && Start Time (taken from Employee.AMstart)
   &cArrayk[1,6]=nEmployeeStart && End Time (same as Start to initiate the array data)
   &cArrayk[1,7]="" && SAMPM - flag for AM job, PM job, or All Day job.
   FOR i = 1 TO ALEN(TMScratch,1)
      * CHECK FOR COMPLEXITY COMPLIANCE BEFORE PROCEEDING
      * First matching job satisfying complexity criterion. This is a parameterized filter.
      IF TMScratch[1,19]<=nMechComplexity .OR.
      Thisform.automile1.chkComplexity.Value=.F.
         Thisform.NumTermini=Thisform.NumTermini+1
         DIMENSION &cArrayk(2,7) && This resizes the array
         &cArrayk[2,1]=TMScratch[1,3] && service code
         &cArrayk[2,2]=(60*TMScratch[1,2]) && duration in minutes.
         &cArrayk[2,3]=TMScratch[1,16] && ABS__X
         &cArrayk[2,4]=TMScratch[1,17] && ABS__Y
         * Start time is determined by value of SAMPM (P = PM, A = AM, E = All Day)
         &cArrayk[2,5]=IIF(TMScratch[1,20]="P",720,nEmployeeStart)
         &cArrayk[2,6]=&cArrayk[2,5] && end time matches start time
         &cArrayk[2,7]=TMScratch[1,20] && SAMPM
         TestRemain=IIF(TMScratch[1,20]="P",TestPMRemainder,TestAMRemainder)
         * Deduct duration from appropriate remainder property (AM or PM)
         &TestRemain=&TestRemain-(60*TMScratch[1,2])
         IF ALEN(TMscratch,1)>1
            ADEL(TMscratch,1) && Delete the array row and then redimension the array:
            DIMENSION TMScratch(ALEN(TMscratch,1)-1,ALEN(TMscratch,2))
            ITMscratchOK=.T.
         ELSE
            ITMscratchOK=.F.
         ENDIF
         Thisform.gaMechanics[k,17]=k && Set gaMech number in 17th column
         Thisform.ITerminiOK=.T.
         EXIT
         * Once a terminus is set, remove it from top of the array "stack"
      ENDIF
   ENDFOR
ENDFOR
```

The ANGLE function receives parameters representing the sequential X-Y coordinates of three points, and then determines the angle proscribed between them, returning that value to the calling function. This function does not return a value greater than 180 degrees or less than zero degrees; if a value outside the acceptable range occurs, it will be converted to the correct value by either adding 360 degrees to it, or subtracting it from 360 degrees. The RTOD command converts radians to degrees, while the ATN2 function returns the arc tangent from the given inputs. The listing for ANGLE follows:

*ANGLE code listing

LPARAMETERS start_x, start_y, end_x1, end_y1, end_x2, end_y2, INormalize

LOCAL angle, nextangle, ndiff

IF PCOUNT( )<7 && If number of received parameters is less than 7
   INormalize=. F.
ENDIF end_x1=end_x1-start_x end_y1=end_y1-start_y IF end_X1=0 .and. end_y1=0
   RETURN 0 && There is no proscribed angle between these points: they're collinear.
ENDIF

ANGLE=RTOD(ATN2(END_X1,-END_Y1))

IF INormalize=.F.
   IF ANGLE<0
   ANGLE=ANGLE+360
   ENDIF
   RETURN angle
ELSE
   end_x2=end_x2-start_x
   end_y2=end_y2-start_y
   IF end_x2=0 .and. end_y2=0
      RETURN 0 && There is no proscribed angle between these points: they're collinear.
   ENDIF
   nextangle=RTOD(ATN2(END_X2,-END_Y2))
   ndiff=ABS(angle-nextangle) && Acquire the absolute value of the difference
   RETURN MIN(ndiff,360-ndiff) && angular difference between the segments
ENDIF Now that the AM termini have been set, and appropriate time deductions made from the available morning time slots for each eligible technician, the next subfunction can be called (assuming we have non-trivial, non-null results arising from the application of the AMTERMINI subfunction). The tasks, which are located in the memory array thisform.gaListMaster, are also copied into time-specific memory arrays, which are subsets of thisform.gaListMaster. These include thisform.gaAJobs for morning jobs, thisform.gaPJobs for afternoon jobs, and thisform.gaEJobs for all-day jobs. One could optionally include a second classification of lower priority tasks associated with preventative maintenance (or, more appropriately, service agreement periodic maintenance) jobs. The task counts for these time-segregated memory arrays are stored in appropriately named properties (e.g., thisform.nAcount is the number of morning jobs), and the existence of a non-empty memory array containing at least one task will flag the appropriately named Boolean property associated with that array (e.g., thisform.lgaAJobsOK shows that there is at least one task in the memory array storing tasks for the morning, namely, thisform.gaAJobs).

Afternoon Sequence

Figure 3:
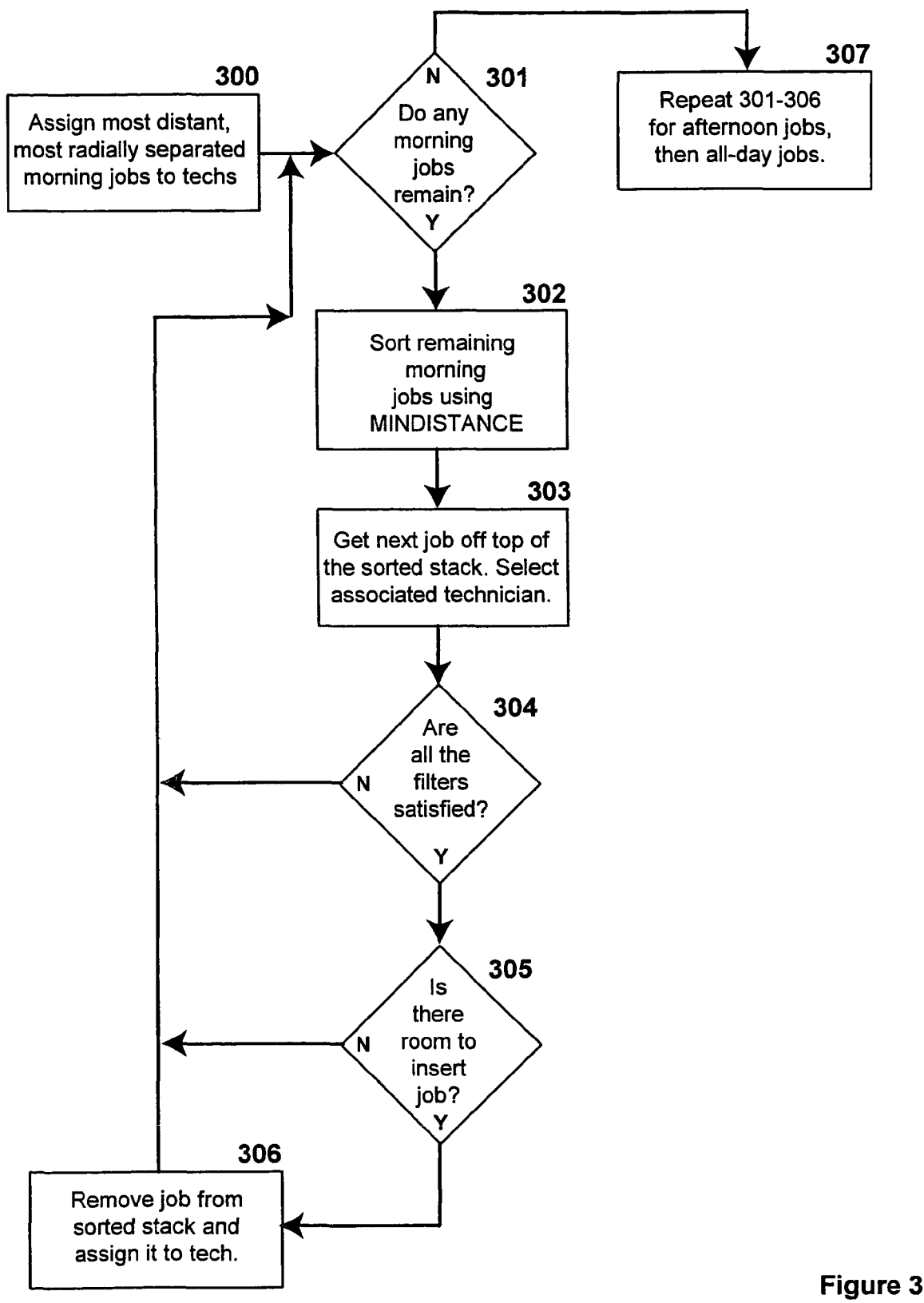
FIG. 3 illustrates the gross level structure of the AUTOMILEAGE subfunction portion of the method applied to the morning period, disclosing the general extensibility of that structure to afternoon and all-day tasks.

FIG. 3 illustrates, in block diagram form, the essential aspects of the AUTOMILEAGE subfunction. Step 300 represents the completion of the AMTERMINI subfunction, which has settled upon appropriately spaced, distant destinations for the technicians to be scheduled. The remaining steps 301 through 306 process all morning jobs, whereupon the same steps are repeated for afternoon jobs and all-day jobs (and any additional category of jobs). It can be appreciated that similar results from the method can be attained if the morning and afternoon jobs are reversed, or if all-day jobs are not necessarily processed in sequence. The method as presented favors the placement of morning and afternoon jobs, and secondarily inserts all-day jobs. Adjustment of the sequence or processing order does not represent any innovation or inventive step over the basic method, but rather reflects some freedom in the application of its specific principles. What does apply in all instances is the implicit pairing, achieved explicitly, of the most distant morning and afternoon jobs to maximize efficiency and minimize distance traveled.

301 determines whether or not any morning jobs remain to be processed. If any exist, they are all sorted by distance, using the MINDISTANCE function, in 302. The closest job (as determined by their ordinal stacking in the sorted data) is examined in 303, with the associated technician (the technician the job is closest to) being selected for further examination. The parametric filters are applied at 304, to insure that the technician satisfies all criteria (qualification, customer preference, excluded technician, etc.). If not, the flow chart returns to 301. If the criteria are satisfied, 305 tests for adequate time in the technician's schedule to permit insertion. If the time is available, the job is added to that technician's task list 306 and the estimated duration of that task is decremented from the available hours for the morning, whereupon the process repeats at 301. Note that the method, as illustrated, does not actually result in an infinite loop because an additional implicit criterion must be understood to obtain at step 301. A fuller, explicit rendering of the actual branching condition at 301 could be rendered, "Do any morning jobs remain, AND are there any time slots available in the morning for any such jobs?" The infinite loop therefore is prevented because the conditions for generating unwanted recursion cannot actually occur.

Step 307 embraces the application of 301 through 306 for afternoon jobs and then for all-day jobs. It can be appreciated that while this system divides the work day into two large time bands (morning and afternoon), this method can be extended to even finer time-banding (adjacent bands two hours wide, adjacent bands three hours wide, even overlapped time bands, etc.), and therefore is not restricted to the example being illustrated throughout this disclosure. Moreover, the sequence of processing of the bands need not strictly be observed to obtain excellent approximations to perfectly optimized routing results.

A more detailed listing for the AUTOMILEAGE subfunction follows.

```
* AUTOMILEAGE subfunction listing:
LPARAMETERS nSegment
IF PCOUNT( )=0
  nSegment="X"
ENDIF
IF Thisform.ITerminiOK=.F. && Don't proceed if no termini are defined.
  RETURN
ENDIF
* Declare local variables for subsequent use
LOCAL nForLoopRangeStart, nForLoopRangeEnd, ISkipThisJob, p
LOCAL cDeduct, AMCount, PMCount
*************************************************************************
* Setup for MORNING Jobs (establish termini)
*************************************************************************
IF thisform.IAJobsOK=.T. && IF there are any morning jobs
  IF thisformAutomile1.chkPriority.Value=.T.
    =ASORT(Thisform.gaAJobs,18,-1,1) && Priority is 18th column (a numeric value 1 to 5)
  ENDIF
  FOR i=1 TO Thisform.nACount
    * Revised block to catch unwanted duplicates
    IF thisform.IMasterOK=.T.
      nFindMatch=ASCAN(thisform.gaMaster,thisform.gaAJobs[i,3],-1,-1,3,8)
    ELSE
      nFindMatch=0
    ENDIF
    IF nFindMatch>0    && Loop if found
      LOOP
    ENDIF
    LOCAL x1, y1, x2, y2, x3, y3, distance, nAMRemainder
    x3=Thisform.gaAJobs[i,16]
    y3=Thisform.gaAJobs[i,17]
    p=0
    * The following block prevents duplicates from occurring in this method.
    ISkipThisJob=.F.
    FOR n = 1 TO ALEN(Thisform.gaMechanics,1)
      IF thisform.gaMechanics[n,17]=0
        LOOP
      ENDIF
      cn=ALLTRIM(STR(n))
      Mechn="gaMech"+cn
      FOR m=1 TO ALEN(&Mechn,1)
        IF &Mechn[m,1]=Thisform.gaAJobs[i,3] && Check for match on Service.code
          ISkipThisJob=.T.
          EXIT
        ENDIF
      ENDFOR
      IF ISkipThisJob=.T. && Don't continue processing FOR..ENDFOR loop if known.
        EXIT
      ENDIF
    ENDFOR
    IF ISkipThisJob=.T. && This exits the loop to avoid duplicate calls in arrays
      LOOP
    ENDIF
    FOR k=1 TO ALEN(thisform.gaMechanics,1)
      IF thisform.gaMechanics[k,12]=.F. && Don't waste time with excluded mechanics.
        LOOP
      ENDIF
      * Loop again if the mechanic isn't properly set up to proceed.
      IF Thisform.gaMechanics[k,17]=0
        LOOP
      ENDIF
      ck=ALLTRIM(STR(k))
      listk="thisform.MechContainer"+ck
      Mechk="gaMech"+ck
      TestAMRemainder=listk+".AMRemainder"
      lIncludeAuto=thisform.gaMechanics[k,12]
      * Skip if Complexity criterion is not adequately satisfied
      IF thisform.Automile1.chkComplexity.Value=.T.
        IF &listk..Complexity<Thisform.gaAJobs[i,19] && Enforce complexity ratings
          loop
        ENDIF
      ENDIF
      IF &TestAMRemainder<60*Thisform.gaAJobs[i,2] &&
        LOOP && The morning is filled; no more jobs will fit
```

-continued

```
            ENDIF
         nForLoopRangeStart = 1
         nForLoopRangeEnd = ALEN(&Mechk,1)-1
         IF ALEN(&Mechk,1)>1 && Check for existing rows in mechanics arrays
            FOR m=nForLoopRangeStart TO nForLoopRangeEnd
               x1 = &Mechk[m,3]
               y1 = &Mechk[m,4]
               IF ALEN(&Mechk,1)>=m+1     && Check for legal values
                  x2 = &Mechk[m+1,3]         && Requires at least 2 objects to proceed
                  y2 = &Mechk[m+1,4]
                  distance=MINDISTANCE(x1,y1,x2,y2,x3,y3)
               ELSE
                  distance=MINDISTANCE(x1,y1,x3,y3)
               endif
               p=p+1
               DIMENSION scratch(p,7)
               scratch[p,1]=i && Job number (gaListMaster row number)
               scratch[p,2]=k && Mechanic number, might be superfluous; check later
               scratch[p,4]=m+1
               scratch[p,3]=ABS(distance) && Distance is always non-negative
               scratch[p,5]=Thisform.gaAJobs[i,16]
               scratch[p,6]=Thisform.gaAJobs[i,17]
               scratch[p,7]=Thisform.gaAJobs[i,20]
            ENDFOR
         ENDIF
      ENDFOR
      IF p>0    && If any eligible mechanics existed
         =ASORT(scratch,3)
         q=scratch[1,2]            && Find the closest mechanic
         y=MAX(2,scratch[1,4])     && the Row number it corresponded to, forced higher than 1
         RELEASE scratch
         cq=ALLTRIM(STR(q))
         Mechq="gaMech"+cq
         listq="thisform.MechContainer"+cq
         TestRemain=listq+".AMRemainder"
         z=ALEN(&Mechq,1)+1
         DIMENSION &Mechq(z,ALEN(&Mechq,2))       && Make room for the job
         AINS(&Mechq,y)                           && Insert job into new row position
         &Mechq[y,1]=Thisform.gaAJobs[i,3]        && service.code
         &Mechq[y,3]=Thisform.gaAJobs[i,16]       && ABS_X
         &Mechq[y,4]=Thisform.gaAJobs[i,17]       && ABS_Y
         &Mechq[y,2]=60*Thisform.gaAJobs[i,2]     && Duration
         &Mechq[y,7]=thisform.gaAJobs[i,20]       && SAMPM
         &Mechq[y,5]=0 && to prevent it from being set to FALSE, for data type mismatch
error
         * Deduct duration from available time remaining for the resource (technician)
         &TestRemain=&TestRemain-(60*Thisform.gaAJobs[i,2])
      ENDIF
   ENDFOR
   FOR k=1 TO ALEN(thisform.gaMechanics,1)
      ck=ALLTRIM(STR(k))
      Mechk="gaMech"+ck
      AMCountk="AMCount"+ck
      IF thisform.gaMechanics[k,17]=0
         &AMCountk=0 && define as zero
         LOOP
      ENDIF
      FOR m=2 TO ALEN(&Mechk,1)
         IF &MechK[m,5]<>720
            &MechK[m,5] = &Mechk[m-1,5]+&Mechk[m-1,2]       && Set proper Start Times
         endif
         &Mechk[m,6] = &Mechk[m,5]+&Mechk[m,2]              && Set proper End Times
      endfor
      &AMCountk=ALEN(&Mechk,1) && Count of AM Jobs for this Mechanic
   ENDFOR
ELSE
   FOR k=1 TO ALEN(thisform.gaMechanics,1) && Sets AMCountk to zero
      ck=ALLTRIM(STR(k))
      Mechk="gaMech"+ck
      AMCountk="AMCount"+ck
      &AMCountk=1 && Count of AM Jobs for this Mechanic (Array row count)
   ENDFOR
ENDIF
* Setup final return termini before adding PJob, EJob and PMJob data
FOR k = 1 TO ALEN(Thisform.gaMechanics,1)
   IF thisform.gaMechanics[k,12]=.F. && Don't process excluded mechanics.
      LOOP
   ENDIF
   * Loop again if the mechanic isn't property set up to proceed.
```

-continued

```
IF Thisform.gaMechanics[k,17]=0
   LOOP
ENDIF
ck=ALLTRIM(STR(k))
Mechk="gaMech"+ck
* Build PM Terminus at Office location
zz=ALEN(&Mechk,1)+1
DIMENSION &Mechk(zz,ALEN(&Mechk,2)) && Make room for the job
FOR v = 2 TO ALEN(&Mechk,2)
   &Mechk[zz,v]=&Mechk[1,v]
ENDFOR
&Mechk[zz,1]=-99999 && Office Return origin point A) must reflect a numeric value.
ENDFOR
***********************************************************************
* Setup for AFTERNOON Jobs (reset termini)
***********************************************************************
IF thisform.IPJobsOK=.T. && IF there are any afternoon jobs
   IF thisform.Automile1.chkPriority.Value=.T.
      =ASORT(Thisform.gaPJobs18,-1,1) && Priority is 18th column
   ENDIF
   FOR i=1 TO Thisform.nPCount
      * Block to catch unwanted duplicates
      IF thisform.IMasterOK=.T.
         nFindMatch=ASCAN(thisform.gaMaster,thisform.gaPJobs[i,3],-1,-1,3,8)
      ELSE
         nFindMatch=0
      ENDIF
      IF nFindMatch>0
         LOOP
      ENDIF
      LOCAL x1, y1, x2, y2, x3, y3, distance, nPMRemainder
      x3=Thisform.gaPJobs[i,16]
      y3=Thisform.gaPJobs[i,17]
      p=0
      LOCAL lSkipThisJob && This block prevents duplicates from occurring in this method.
      lSkipThisJob=.F.
      FOR n = 1 TO ALEN(Thisform.gaMechanics,1)
         IF thisform.gaMechanics[n,17]=0
            LOOP
         ENDIF
         cn=ALLTRIM(STR(n))
         Mechn="gaMech"+cn
         FOR j=1 TO ALEN(&Mechn,1)
            IF &Mechn[j,1]=Thisform.gaPJobs[i,3] && Check for match on Service.code
               lSkipThisJob=.T.
               EXIT
            ENDIF
         ENDFOR
         IF lSkipThisJob=.T. && Don't process FOR..ENDFOR loop if this is known
            EXIT
         ENDIF
      ENDFOR
      IF lSkipThisJob=.T. && This exits us out of loop to avoid duplicate calls in arrays
         LOOP
      ENDIF
      FOR k=1 TO ALEN(thisform.gaMechanics,1)
         IF thisform.gaMechanics[k,12]=.F. && Don't process excluded mechanics.
            LOOP
         ENDIF
         * Loop again if the mechanic isn't properly set up to proceed.
         IF Thisform.gaMechanics[k,17]=0
            LOOP
         ENDIF
         ck=ALLTRIM(STR(k))
         listk="thisform.MechContainer"+ck
         Mechk="gaMech"+ck
         TestPMRemainder=listk+".PMRemainder"
         lIncludeAuto=thisform.gaMechanics[k,12]
         AMCountK="AMCount"+ck
         IF thisform.Automile1.chkComplexity.Value=.T.
            IF &listk..Complexity<Thisform.gaPJobs[i,19] && Enforce complexity ratings
               LOOP
            ENDIF
         ENDIF
         IF &TestPMRemainder<(60*Thisform.gaPJobs[i,2])
            LOOP       && The afternoon is filled; no more jobs will fit
         ENDIF
         nForLoopRangeStart = &AMCountK
         nForLoopRangeEnd = ALEN(&Mechk,1)-1
```

-continued

```
    IF ALEN(&Mechk,1)>1 && Check for existing rows in mechanics arrays
        FOR m=nForLoopRangeStart TO nForLoopRangeEnd
            x1 = &Mechk[m,3]
            y1 = &Mechk[m,4]
            IF ALEN(&Mechk,1)>=m+1 && Check for legal values to avoid crash
                x2 = &Mechk[m+1,3]
                y2 = &Mechk[m+1,4]
                distance=MINDISTANCE(x1,y1,x2,y2,x3,y3)
            ELSE
                distance=MINDISTANCE(x1,y1,x3,y3)
            ENDIF
            p=p+1
            DIMENSION scratch(p,7)
            scratch[p,1]=i && Job number (gaListMaster row number)
            scratch[p,2]=k && Mechanic number
            scratch[p,4]=m+1
            scratch[p,3]=ABS(distance) && Distance may not be negative
            scratch[p,5]=Thisform.gaPJobs[i,16]
            scratch[p,6]=Thisform.gaPJobs[i,17]
            scratch[p,7]=Thisform.gaPJobs[i,20]
        ENDFOR
    ENDIF
ENDFOR
IF p>0                      && If any eligible mechanics existed
    =ASORT(scratch,3)
    q=scratch[1,2]          && Find the closest mechanic
    y=MAX(2,scratch[1,4])   && the Row number it corresponded to, forced higher than 1
    RELEASE scratch
    cq=ALLTRIM(STR(q))
    Mechq="gaMech"+cq
    listq="thisform.MechContainer"+cq
    TestRemain=listq+".PMRemainder"
    z=ALEN(&Mechq,1)+1
    DIMENSION &Mechq(z,ALEN(&Mechq,2)) && Make room for the job
    AINS(&Mechq,y)          && Insert job into new correct row position
    &Mechq[y,1]=Thisform.gaPJobs[i,3] && service.code
    &Mechq[y,3]=Thisform.gaPJobs[i,16] && ABS_X
    &Mechq[y,4]=Thisform.gaPJobs[i,17] && ABS_Y
    &Mechq[y,2]=60*Thisform.gaPJobs[i,2] && Duration
    &Mechq[y,7]=Thisform.gaPJobs[i,20] && SAMPM
    &Mechq[y,5]=720 && Prevent it from being set to FALSE
    * Deduct duration from time remaining in the appropriate property affected.
    &TestRemain=&TestRemain-(60*Thisform.gaPJobs[i,2])
ENDIF
ENDFOR
FOR k=1 TO ALEN(thisform.gaMechanics,1)
    IF thisform.gaMechanics[k,17]=0
        LOOP
    ENDIF
    ck=ALLTRIM(STR(k))
    Mechk="gaMech"+ck
    PMCountk="PMCount"+ck
    AMCountK="AMCount"+ck
    IF VARTYPE(&AMCountK)="N" && if it's "U" (unknown), there were no AM entries
        FOR m=&AMcountK+1 TO ALEN(&Mechk,1)
            sam=MAX(&Mechk[m-1,5]+&Mechk[m-1,2],720) && Set proper Start Times
            &MechK[m,5] = MAX(&Mechk[m-1,5]+&Mechk[m-1,2],720)
            &Mechk[m,6] = &Mechk[m,5]+&Mechk[m,2] && Set proper End Times
        ENDFOR
    ENDIF
    &PMCountk=ALEN(&Mechk,1) && Count of PM Jobs for this Technician
ENDFOR
ENDIF
************************************************************************
* Setup for ALL DAY Jobs (reset termini)
************************************************************************
IF thisform.IEJobsOK=.T. && IF there are any all-day jobs
    IF thisformAutomile1.chkPriority.Value=.T.
        =ASORT(Thisform.gaEJobs,18,-1,1) && Priority is 18th column
    ENDIF
    FOR i=1 TO Thisform.nECount && ALEN(gaJobs,1)
        * Block to catch unwanted duplicates
        IF thisform.IMasterOK=.T.
            nFindMatch=ASCAN(thisform.gaMaster,thisform.gaEJobs[i,3],-1,-1,3,8)
        ELSE
            nFindMatch=0
        ENDIF
        IF nFindMatch>0
```

```
      LOOP
   ENDIF
LOCAL x1, y1, x2, y2, x3, y3, distance, nPMRemainder, nAMRemainder
x3=Thisform.gaEJobs[i,16]
y3=Thisform.gaEJobs[i,17]
p=0
LOCAL ISkipThisJob && This block prevents duplicates from occurring in this method.
ISkipThisJob=.F.
FOR n = 1 TO ALEN(Thisform.gaMechanics,1)
   IF thisform.gaMechanics[n,17]=0
      LOOP
   ENDIF
   cn=ALLTRIM(STR(n))
   Mechn="gaMech"+cn
   FOR j=1 TO ALEN(&Mechn,1)
      IF &Mechn[j,1]=Thisform.gaEJobs[i,3] && Check for match on Service.code
         ISkipThisJob=.T.
         EXIT
      ENDIF
   ENDFOR
   IF ISkipThisJob=.T. && Don't process FOR..ENDFOR loop if we know this.
      EXIT
   ENDIF
ENDFOR
IF ISkipThisJob=.T. && Exit loop to avoid duplicate calls in arrays
   LOOP
ENDIF
FOR k=1 TO ALEN(thisform.gaMechanics,1)
   IF thisform.gaMechanics[k,12]=.F. && Don't process excluded technicians.
      LOOP
   ENDIF
   * Loop again if the technician isn't properly set up to proceed.
   IF Thisform.gaMechanics[k,17]=0
      LOOP
   ENDIF
   ck=ALLTRIM(STR(k))
   listk="thisform.MechContainer"+ck
   Mechk="gaMech"+ck
   TestPMRemainder=listk+".PMRemainder"
   TestAMRemainder=listk+".AMRemainder"
   lIncludeAuto=thisform.gaMechanics[k,12]
   AMCountK="AMCount"+ck
   PMCountK="PMCount"+ck
   IF thisformAutomile1.chkComplexity.Value=.T.
      IF &listk..Complexity<Thisform.gaEJobs[i,19] && Enforce complexity ratings
         LOOP
      ENDIF
   ENDIF
   sam=&TestAMRemainder
   tom=&TestPMRemainder
   DO CASE
      CASE &TestAMRemainder<(60*Thisform.gaEJobs[i,2]) .AND.
         &TestPMRemainder<(60*Thisform.gaEJobs[i,2])
         LOOP && The whole day is filled; no more jobs will fit
      CASE &TestAMRemainder<(60*Thisform.gaEJobs[i,2]) && Only PM will fit
         nForLoopRangeStart = MAX(1,&AMCountk)
         nForLoopRangeEnd = ALEN(&Mechk,1)-1
         * Must deduct from PM Remainder
      CASE &TestPMRemainder<(60*Thisform.gaEJobs[i,2]) && Only AM will fit
         nForLoopRangeStart = 1
         nForLoopRangeEnd = &AMCountk-1
         * Must deduct from AMRemainder
      OTHERWISE && Use AM or PM, so termini are expanded to farthest limits
         nForLoopRangeStart = 1
         nForLoopRangeEnd = ALEN(&Mechk,1)-1
   ENDCASE
   IF ALEN(&Mechk,1)>1 && Check for existing rows in mechanics arrays
      IF nForLoopRangeStart>nForLoopRangeEnd
         LOOP
      endif
      FOR m=nForLoopRangeStart TO nForLoopRangeEnd
         x1 = &Mechk[m,3]
         y1 = &Mechk[m,4]
         IF ALEN(&Mechk,1)>=m+1 && Check for legal values
            x2 = &Mechk[m+1,3]
            y2 = &Mechk[m+1,4]
            distance=MINDISTANCE(x1,y1,x2,y2,x3,y3)
         ELSE
            distance=MINDISTANCE(x1,y1,x3,y3)
```

-continued

```
            ENDIF
            p=p+1
            DIMENSION scratch(p,7)
            scratch[p,1]=i && Job number (gaListMaster row number)
            scratch[p,2]=k && Mechanic number, might be superfluous; check later
            scratch[p,4]=m+1
            scratch[p,3]=ABS(distance) && Distance is always non-negative
            scratch[p,5]=Thisform.gaEJobs[i,16]
            scratch[p,6]=Thisform.gaEJobs[i,17]
            scratch[p,7]=Thisform.gaEJobs[i,20] && SAMPM
         ENDFOR
      ENDIF
ENDFOR
IF p>0 && If any eligible mechanics existed
   =ASORT(scratch,3)
   q=scratch[1,2] && Find the closest mechanic
   y=MAX(2,scratch[1,4]) && the Row number it corresponded to, forced higher than 1.
   cq=ALLTRIM(STR(q))
   Mechq="gaMech"+cq
   listq="thisform.MechContainer"+cq
   FOR b=2 TO ALEN(&Mechq,1) && PM 720 value required. Can't be centralized.
      IF &Mechq[b,7] = "P" && Lunch Time. Can be generalized.
         &Mechq[b,5] = MAX(720,&Mechq[b−1,5]+&Mechq[b−1,2]) && Set Start Times
      ELSE
         &Mechq[b,5] = &Mechq[b−1,5]+&Mechq[b−1,2] && Set proper Start Times
      ENDIF
      &Mechq[b,6] = &Mechq[b,5]+&Mechq[b,2] && Set proper End Times
   ENDFOR
   LOCAL lInsert, nInsert
   FOR b = 1 TO ALEN(Scratch,1) && Scratch must exist (p>0) Already in mile order
      q=scratch[b,2] && Find the closest mechanic
      y=MAX(2,scratch[b,4]) && Row number it corresponded to, forced higher than 1
      cq=ALLTRIM(STR(q))
      Mechq="gaMech"+cq
      listq="thisform.MechContainer"+cq
      TestRemainA=listq+".AMRemainder"
      TestRemainP=listq+".PMRemainder"
      IF &Mechq[y,5]=>720
         TestRemain=TestRemain P
      ELSE
         TestRemain=TestRemainA
      ENDIF
      nInsert=0
      FOR h = 1 TO ALEN(&Mechq,1) && Confirm validity of technician
         lInsert=.F.
         IF &TestRemainA+&TestRemainP−(60*Thisform.gaEJobs[i,2])<0
            lInsert=.F.
            EXIT
         ENDIF
         IF &Mechq[h,7]="A"
            nInsert=MAX(nInsert,&Mechq[h,5]+&Mechq[y,2]) && Initialized to zero
         ELSE
            lInsert=.T.
            EXIT
         ENDIF
         IF nInsert=>720 .and. TestRemain=TestRemainA && Squeeze into AM
            lInsert=.F.
            EXIT
         ELSE
            lInsert=.T.
         ENDIF
      ENDFOR
      IF lInsert=.T.
         EXIT     && This sets the value for q, cq, y for following insertion,
         ENDIF    && Using the closest mechanic that is valid.
   ENDFOR
   IF lInsert=.F.  && Find a legitimate close place to stick it
      LOOP        && no valid insertion point, apparently. Job kicked out entirely.
   ENDIF
   z=ALEN(&Mechq,1)+1
   DIMENSION &Mechq(z,ALEN(&Mechq,2)) && Make room for the job
   AINS(&Mechq,y) && Insert job into new correct row position
   &Mechq[y,1]=Thisform.gaEJobs[i,3]          && service.code
   &Mechq[y,3]=Thisform.gaEJobs[i,16]         && ABS_X
   &Mechq[y,4]=Thisform.gaEJobs[i,17]         && ABS_Y
   &Mechq[y,5]=0                              && Arbitrarily set it
   &Mechq[y,2]=(60*Thisform.gaEJobs[i,2])     && Duration
   &Mechq[y,7]=thisform.gaEJobs[i,20]         && SAMPM
   * Deduct duration from available time
```

-continued

```
    &TestRemain=&TestRemain-(60*Thisform.gaEJobs[i,2])
    RELEASE scratch
    * This block invoked from outside the loop to write the 5th column start time values
    FOR m=2 TO ALEN(&Mechq,1)
        IF &Mechq[m,7] = "P" && Lunch Time. Can be generalized.
            &Mechq[m,5] = MAX(720,&Mechq[m-1,5]+&Mechq[m-1,2])
        ELSE
            &Mechq[m,5] = &Mechq[m-1,5]+&Mechq[m-1,2] && Set proper Start Times
        ENDIF
        &Mechq[m,6] = &Mechq[m,5]+&Mechq[m,2] && Set proper End Times
    ENDFOR
  ENDIF
 ENDFOR
ENDIF
```

Assigning Tasks to Resources

Upon completion of the AUTOMILEAGE subfunction, the dispatching system is ready to assign all the tasks to the resources. All tasks and resources have been correlated with parametric filtration, which was used to exit or cycle various loop functions when certain filter criteria were either met or unmet. The following function, TESTDISPATCH, completes the route-optimized scheduling process. It invokes routines specific to the actual dispatching program with which it was originally associated (functions such as "jobcreate"), but it is to be understood that such citation is provided by way of example only, and that the method could just as easily feed any generalized program that displays and governs the allocation of resources to tasks, such as the dispatching program contemplated hereunder.

```
* TESTDISPATCH Subfunction
IF Thisform.ITerminiOK=.F. && Don't proceed if no termini are defined.
    RETURN
ENDIF
LOCAL lpresource, nSearchThis, x1, y1, x2, y2, ndistance, totaldistance, nNumMechsUsed
nNumMechsUsed=0
totaldistance=0
ndistance=0
lpresource=0
FOR n = 1 TO ALEN(Thisform.gaMechanics,1)
    ndistance=0
    IF thisform.gaMechanics[n,17]=0 && Filter out illegitimate technician entries.
        LOOP
    ENDIF
    nNumMechsUsed=nNumMechsUsed+1 && Increment to count the mechanics used
    cn=ALLTRIM(STR(n))
    listn="thisform.MechContainer"+cn
    TestAMRemainder=listn+".AMRemainder"
    TestPMRemainder=listn+".PMRemainder"
    * Reset AM-PM Remainder properties of the MechContainers
    &TestAMRemainder=MAX(720-Thisform.gaMechanics[n,13],0) && Between start and
noon
    &TestPMRemainder=MAX(Thisform.gaMechanics[n,14]-720,0) && Between noon and end
    cn=ALLTRIM(STR(n))
    Mechn="gaMech"+cn
    FOR m=2 TO ALEN(&Mechn,1)
        * (Reset all intrinsic functions -- undisclosed here because not pertinent)
        LOCAL cMinutes, StdTime
        * Express time in standard units using conventional conversion routines (undisclosed)
        IF &Mechn[m,2]>0 && If a non-zero duration (means a real task that was assigned)
            * Invoke routine to create the task assignment ("jobcreate" with parameter list)
            DO jobcreate WITH (appropriate parameter list - undisclosed/not pertinent)
            * Exclude mechanics that were assigned tasks by this method
            IF thisform.gaMechanics[n,12]=.T.
                thisform.gaMechanics[n,12]=.F.
                Thisform.NumMechsIncluded=Thisform.NumMechsIncluded-1
                Thisform.NumMechsExcluded=Thisform.NumMechsExcluded+1
                thisform.Automile1.lstIncluded.Requery( ) && reacquire list of technicians
                thisform.Automile1.LstExcluded.Requery( ) && reacquire list of technicians
            ENDIF
        ENDIF
    ENDFOR
    * Code below totals all mileage for display across top of screen for user feedback on
results.
    FOR m=1 TO ALEN(&Mechn,1)-1
        x1 = &Mechn[m,3]
        y1 = &Mechn[m,4]
```

-continued

```
    x2 = &Mechn[m+1,3]
    y2 = &Mechn[m+1,4]
        ndistance=ndistance+ABS(newmile2(x1,y1,x2,y2)) && 1-way distance measurements.
    ENDFOR
    totaldistance=totaldistance+ndistance
    RELEASE &Mechn  && close outstanding memory items (housekeeping)
ENDFOR
* Display value of totaldistance as best optimized distance for all technicians for entire day.
```

It should be noted that the method as presented above will prevent any further processing from being applied to technicians that have had tasks allocated to them by the method. This is effected by redefining such technicians as excluded and ineligible for further assignment. The flags to implement this redefinition are set at the end of the method. This allows the method to control the entire configuration of task assignments, working from a blank slate, but it does not permit the user to predetermine any tasks manually, in advance of the method being applied. A more generalized version of this method would take existing task allocations that were manually assigned and place them in the appropriate rows of the affected memory arrays. An additional Boolean flag would be required (and would occupy an additional column in all pertinent memory arrays), which determines whether or not a given task can be moved from its currently assigned start time. The method would then use these new initial conditions and process unassigned tasks, finding the most efficient assignment of these tasks to the current set of resources. Such an extension of the existing code would be readily prosecuted by anyone skilled in the art. The instant invention incorporates this extended functionality by explicit reference herein.

Some aspects of the detailed listings are specific to a certain actual implementation of the method in an actual software package, and are understood to be related to deployment and interface concerns rather than representing the core of the method and its utility herein. This fact is evident in the object hierarchy, which is specific to components written in the Microsoft Visual Foxpro database language, and is most obvious in the TESTDISPATCH subfunction, where the results of the method are applied. The embedding of the method in such a specific setting is to be understood as not limiting or restricting its implementation or deployment to the case in hand, which was provided for illustrative purposes only.

What is claimed is:

1. A computer-implemented method for scheduling a plurality of service vehicles from a selected origin point to a plurality of geographically dispersed tasks within a selected period of time by evaluating parametrically filtered assessments on a series of incrementally rotated optimization overlays, the method comprising:
   identifying a candidate set of tasks to be scheduled, and, for each of the tasks in the candidate set, identifying a geographic position, and approximate required task duration;
   identifying a set of constraints associated with each member of the candidate set of tasks to be scheduled;
   determining the number of vehicles to be allocated to the tasks, and for each vehicle determining a vehicle task sequence by
      determining a first trial schedule comprising a sequence for each vehicle by allocating the candidate set of tasks into a pie shape with slices radiating from the starting point, such that the number of slices is determined by the number of vehicles to be allocated, for each slice
         identifying a distal point task, while satisfying any imposed constraints, such that the distal point task is located at the extremity of the slice, such that the starting point and the distal point task define a central axis of the slice, establishing a vehicle task sequence, the initial vehicle task sequence comprising the starting point to distal point task back to starting point, identifying an intermediate task set comprising other tasks geographically located within a specified distance from the central axis of the slice, continuing to build the vehicle task sequence by sequentially selecting intermediate points from the intermediate task set, and inserting the selected points into the vehicle task sequence until a capacity limit for the vehicle is reached;
         restricting eligibility for inclusion in the vehicle task sequence by comparative assessment against one or more parameters that serve to filter candidate tasks according to the parametric filtration thus implemented, thereby imposing the appropriate constraints on a task by task basis relative to each specific vehicle for which a sequence of tasks is being assembled;
   determining at least one evaluation metric for the first trial schedule;
   determining additional trial schedules by reallocating the candidate set of tasks by rotating the coordinate set centered on the origin point through an arbitrary angle, and determining at least one evaluation metric for each additional trial schedule; and
   selecting a schedule from the set of trial schedules; wherein said determining a vehicle task sequence, determining at least one evaluation metric, and determining additional trial schedules are performed by the computer.

2. The method of claim 1 wherein
the constraints comprise at least one of
the urgency of the task;
the complexity of the task;
preference of vehicle to be assigned to the task; and
time constraints for when the task must be conducted.

3. The method of claim 2 wherein
time constraints further comprise a set of time bands.

4. The method of claim 2 wherein
time constraints further comprise a two-band system distinguishing tasks requiring vehicle dispatch during a first time period, and tasks requiring vehicle dispatch during a second time period.

5. The method of claim 4 wherein
time constraints further comprise multiple-band systems that further constrain the dispatch time to shorter periods of available time during the day, such that the shorter periods of available time are shorter than the first time period and the second time period.

6. The method of claim 1 wherein identifying an intermediate task set comprising other tasks geographically located within a specified band distance from the central axis of the slice further comprises:

determining and utilizing the shortest of the distances determined by the distance of a new intermediate task to any other given point within an existing task sequence, and the tangential distance of a new intermediate task to a line drawn between any two consecutive tasks already existing in a task sequence, where such tangential distance is calculated by calculating the line between the two consecutive existing tasks in a given vehicle task sequence, drawing a line perpendicular to the line joining the two consecutive existing tasks, and causing the perpendicular line to pass through the new intermediate task, and allowing the distance from the new task to the line joining the two consecutive existing tasks to be calculated algebraically.

7. The method of claim 1 wherein continuing to build the vehicle task sequence by sequentially selecting intermediate points from the intermediate task set, and inserting the selected points into the vehicle task sequence until a capacity limit for the vehicle is reached further comprises:

storing the vehicle task sequence;

changing a capacity constraint;

determining a modified vehicle task sequence; and determining and reporting an incremental cost associated with the modified vehicle task sequence.

8. The method of claim 1 wherein continuing to build the vehicle task sequence by sequentially selecting intermediate points from the intermediate task set, and inserting the selected points into the vehicle task sequence until a capacity limit for the vehicle is reached further comprises:

storing the vehicle task sequence, allowing a user to manually alter the vehicle task sequence, and determining and reporting an incremental cost associated with the manually modified vehicle task sequence.

9. The method of claim 1 wherein identifying a distal point task, while satisfying any imposed constraints further comprises:

imposing a two-band system.

10. The method of claim 9 wherein imposing a two-band system further comprises:

identifying the farthest distal point tasks in a first time band;

identifying the farthest distal point tasks in a second time band, such that the second time band is later than the first time band;

applying a proximity test to identify pairings between distal point tasks in the first and second time bands;

designating the closest of the identified pairings as explicitly consecutive tasks within a pie slice, temporally occurring at the transitional boundary between the two time bands, for the vehicle to be assigned to the slice.

11. The method of claim 1 wherein the distances computed between various points in the vehicle task sequence is determined by actual travel distances as extracted from third-party mapping software.

12. The method of claim 1 wherein establishing a vehicle task sequence, the initial vehicle task sequence comprising the starting point to distal point task back to starting point further comprises:

vehicles where the respective starting points do not match from vehicle to vehicle.

13. The method of claim 1 wherein establishing a vehicle task sequence, the initial vehicle task sequence comprising the starting point to distal point task back to starting point further comprises:

one or more vehicles where the vehicle does not return to the starting point, but to another selected point after the distal task is completed.

* * * * *